United States Patent [19]

Guichard et al.

[11] Patent Number: 5,519,317
[45] Date of Patent: May 21, 1996

[54] INDUCTIVE PROXIMITY SENSOR FOR DETECTING FERROUS AND NON-FERROUS OBJECTS

[75] Inventors: Christophe Guichard, Angouleme; Didier Leonard, Moulidars, both of France

[73] Assignee: Schneider Electric SA, Boulogne-Billancourt, France

[21] Appl. No.: 397,956

[22] Filed: Mar. 3, 1995

[30] Foreign Application Priority Data

Mar. 4, 1994 [FR] France .................. 94 02623

[51] Int. Cl.$^6$ .................. G01N 27/00; G01V 3/10; H03K 17/95
[52] U.S. Cl. .................. 324/236; 324/327; 324/334; 331/65
[58] Field of Search .................. 324/327, 328, 324/332, 333, 207.16, 207.26, 233, 234, 236–238; 331/65; 361/180; 307/116, 117

[56] References Cited

U.S. PATENT DOCUMENTS

| | | | |
|---|---|---|---|
| 3,201,774 | 8/1965 | Uemura | 324/327 X |
| 3,826,973 | 7/1974 | Pflaum | 324/233 X |
| 3,896,371 | 7/1975 | Hametta | 324/327 |
| 4,473,799 | 9/1984 | Favre | 324/236 X |
| 4,879,531 | 11/1989 | Tigges et al. | 324/327 X |

FOREIGN PATENT DOCUMENTS

| | | |
|---|---|---|
| 0393359A2 | 10/1990 | European Pat. Off. . |
| 0399563A2 | 11/1990 | European Pat. Off. . |
| 4212363A1 | 10/1993 | Germany . |
| 2158583 | 11/1985 | United Kingdom . |
| EP0222805 | 11/1986 | WIPO . |

*Primary Examiner*—Gerard R. Strecker
*Attorney, Agent, or Firm*—Oblon, Spivak, McClelland, Maier & Neustadt

[57] ABSTRACT

An inductive proximity sensor has a resonant circuit including a sensing coil and driven by an oscillator at a predetermined frequency. To sense selectively ferrous and non-ferrous objects, the excitation frequency is a subcritical excitation frequency and discriminator logic is provided to process a phase-shift signal and a damping signal.

8 Claims, 2 Drawing Sheets

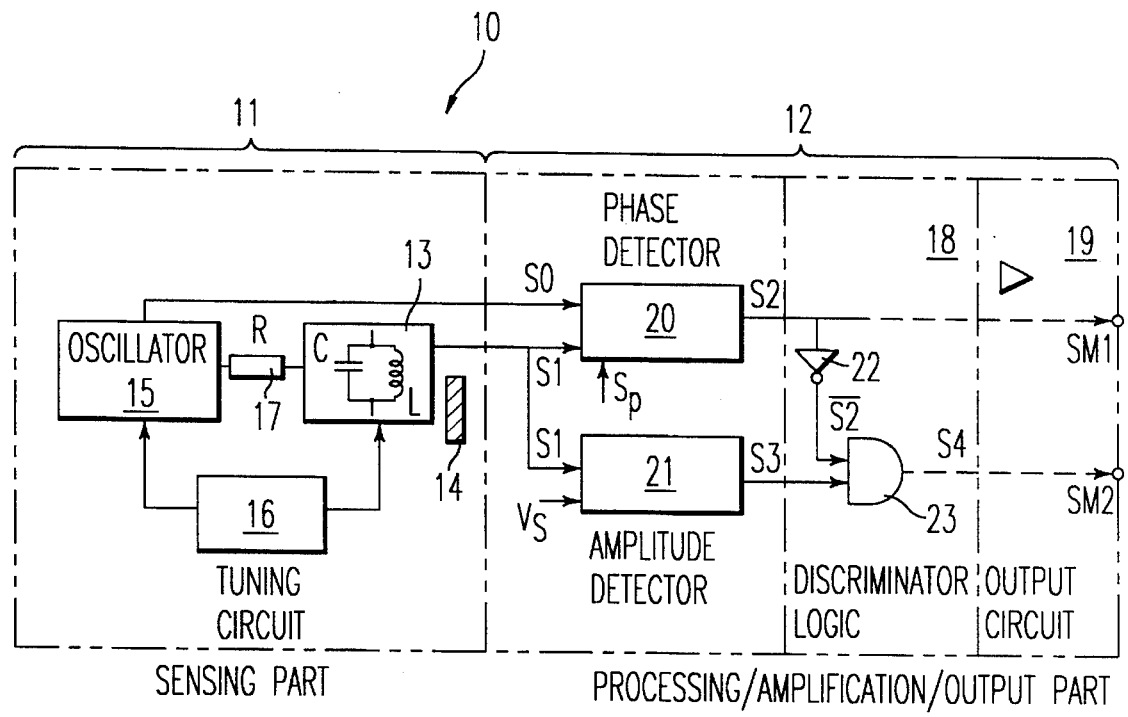
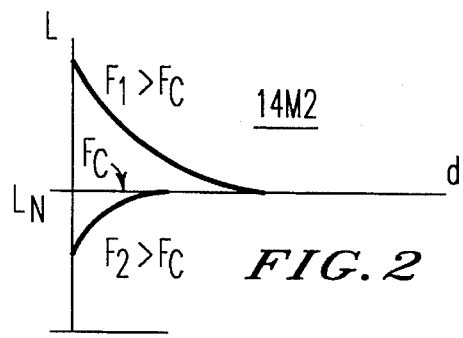
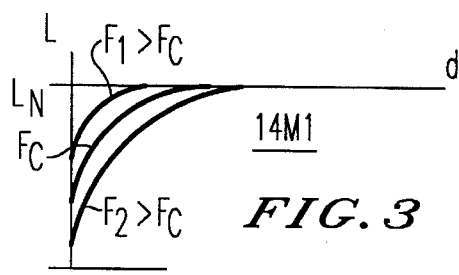
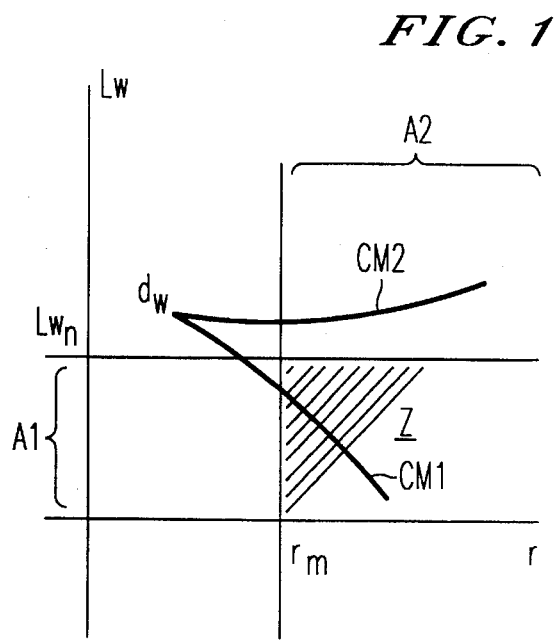
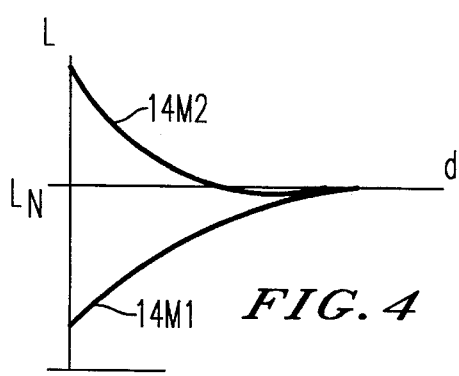

INDUCTIVE PROXIMITY SENSOR FOR DETECTING FERROUS AND NON-FERROUS OBJECTS

BACKGROUND OF THE INVENTION

1. Field of the invention

The present invention concerns an inductive proximity sensor of the type including a resonant circuit including a sensing coil, an oscillator driving the resonant circuit at a predetermined frequency and a circuit for processing the signal generated by the oscillatory circuit in response to a metal object.

2. Description of the Prior Art

Ferrous metal (e.g. iron or steel) objects usually have a high magnetic permeability and a moderate resistivity. Non-ferrous metal (e.g. aluminum, copper, brass, etc) objects have a very low permeability ($\mu_r \cong 1$) and a very low resistivity. Metal objects in the field of the sensing coil of a normal proximity sensor therefore cause lower losses if they are made of non-ferrous metal; accordingly, the range at which these sensors can sense non-ferrous objects is much less than that for ferrous objects.

Specific provisions are therefore required if it is to be possible to sense ferrous and non-ferrous objects at the same distance. Patent DE-32 28 524 describes a sensor of the type indicated above and able to detect ferrous and non-ferrous objects at the same range. However, a sensor of this kind has the drawback of not enabling selective sensing of ferrous metal objects and non-ferrous metal objects.

An object of the invention is to provide an inductive proximity sensor which can sense at the same range and distinguish between ferrous metal objects and non-metal ferrous objects, using simple means and with highly reliable differentiation.

SUMMARY OF THE INVENTION

The invention includes an inductive proximity sensor including a coil for sensing metal objects forming part of a resonant circuit, a circuit for processing a signal generated by said resonant circuit and an output circuit, said processing circuit including means for sensing ferrous objects and non-ferrous objects including an amplitude sensor to the input of which the voltage signal from the resonant circuit is applied and which delivers a damping signal if the amplitude of said signal from said resonant circuit falls below a predetermined threshold, wherein:

said resonant circuit is driven by a fixed frequency oscillator at a subcritical excitation frequency, said sensing means include a phase sensor to the input of which said voltage signal from said resonant circuit is applied and which delivers a phase-shift signal if the phase-shift of said resonant circuit exceeds a particular threshold, and discriminator logic delivers to said output circuit a signal indicating the presence of a non-ferrous object if said phase-shift signal is active and a signal indicating the presence of a ferrous object if said phase-shift signal is inactive and said damping signal is active.

The expression "sub-critical excitation frequency" means that the excitation frequency supplied by the oscillator is less than the critical excitation frequency associated with the sensing coil; this critical frequency is defined as the excitation frequency for which the inductance of the coil remains substantially constant as a ferrous object approaches the sensor, regardless of the distance between the object and the sensor. Using a subcritical excitation frequency distinguishes ferrous and non-ferrous objects, which respectively increase and decrease the inductance.

Regarding the impedance of the coil as the sum of its reactance and a loss resistance, there is no ambiguity in respect of sensing a non-ferrous object if such sensing is tied to a criterion of the reactance being under the threshold. To resolve any possibility of ambiguity, the sensing of a ferrous object must combine the conditions of the reactance remaining above a threshold and of the loss resistance exceeding a particular level.

The reliability of the resulting differentiation between signals indicating the presence of ferrous and non-ferrous objects is satisfactory.

Some metal objects exhibit an intermediate magnetic behavior, for example objects made from stainless steel, low-conductivity amagnetic materials such as lead and titanium, or thin non-ferrous materials. Their sensing may be impossible, because the sensing range is reduced, or intermittent or even incorrect. The phase detector therefore outputs an inhibiting signal if the phase-shift of the resonant circuit signal exceeds a predetermined second threshold below the first phase-shift threshold, the inhibiting signal being applied to the discriminator logic to invalidate the signal indicating the presence of ferrous objects.

One embodiment of the invention will now be described with reference to the appended drawings.

BRIEF DESCRIPTION OF THE DRAWINGS

FIG. 1 is a block schematic of an inductive proximity sensor of the invention.

FIGS. 2 through 4 are various curves showing the variation in the inductance of a sensing coil.

FIG. 5 is a Nyquist diagram used to explain the selectivity of the sensor of the invention.

DETAILED DESCRIPTION OF THE PREFERRED EMBODIMENTS

Figure 6:
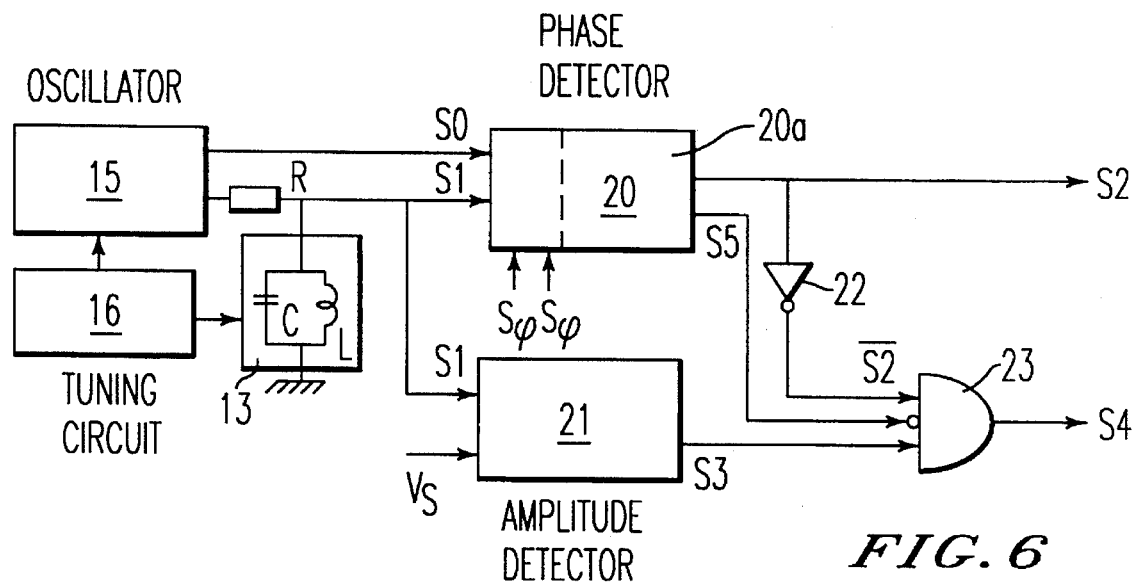
FIG. 6 is a block diagram of another embodiment of the invention.

The selective proximity sensor 10 shown in FIG. 1 is of the inductive type and has a sensing part 11 and a processing/amplification/output part 12.

The sensing part includes a resonant circuit 13 comprising a coil of inductance L and a capacitor C, the coil being disposed so that it is affected by a metal object 14. The resonant circuit 13 has a natural frequency $F_{LC}$ and an impedance $Z_{LC}$ and it is driven by an oscillator 15 oscillating at frequency $F_0$ and at constant amplitude. A tuning circuit 16 is used to tune the frequency $F_0$ of the oscillator and the natural frequency $F_{LC}$ of the resonant circuit exactly when no object 14 is present or to impose a slight phase difference between them. A high impedance 17 (for example a resistor R with a resistance much higher than $Z_{LC}$) imposes a constant excitation current in the resonant circuit. The sensing part 11 delivers to the processing part 12 a signal SO which is the signal delivered by the oscillator 15, with or without frequency division, and a signal S1 which is the voltage signal across the resonant circuit 13; the signal S1 varies according to the distance of a metal object 14.

The processing part 12 includes a phase detector and comparator circuit 20 referred to hereinafter as a phase detector, for short, an amplitude detector and comparator 21, referred to hereinafter as an amplitude detector, for short, discriminator logic 18 and an output circuit 19. The phase detector 20 receives the signals S0 and S1 and compares their phase difference with a threshold Sφ. Phase detector 20 delivers at its output a phase-shift signal S2 if the absolute value of the phase-difference exceeds the threshold Sφ. The amplitude sensor 21 receives the voltage signal S1 and compares its amplitude to a threshold VS. The amplitude detector 21 delivers at its output a damping signal S3 if the amplitude of signal S1 is less than the threshold VS. The detectors 20, 21 have the usual hysteresis characteristics.

The discriminator logic is implemented in any manner known to the person skilled in the art to fulfil the discrimination function now described. For example, the signal S2 is inverted by an inverter 22 and the resulting signal $\overline{S2}$ and the damping signal S3 are applied to the inputs of an AND gate 23 producing an output signal S4. The signals S2, S4 respectively representative of a non-ferrous object and a ferrous object are applied to the output circuit 19 to drive a display and/or to selectively activate output conductors (respective signals SM1, SM2). The parts 11, 12 of the proximity sensor are supplied with power in any of the usual ways. It is obvious that the "selective" sensor can easily be converted into a "universal" sensor by using an OR gate to combine the signals S2, on the one hand, and S3 or S4, on the other hand; this logic gate is either hardwired or controlled by a "selective/universal sensing" switch.

FIG. 2 shows how the inductance L of a coil varies with the distance $\underline{d}$ of a ferrous metal object 14M2 for various coil excitation frequencies; as the object moves closer, for a critical frequency $F_C$, the inductance retains virtually the same nominal value $L_N$, regardless of the distance; for a frequency $F_1 < F_C$ the inductance increases as the distance decreases and for a frequency $F_2 > F_C$ the inductance decreases as the distance decreases.

FIG. 3 shows the variation in the inductance L as a non-ferrous object 14M1 moves closer with the same frequencies $F_C$, $F_1$ and $F_2$.

FIG. 4 explains the choice of an excitation frequency $F_0 < F_C$ for which the inductance L increases as a ferrous object moves closer and decreases as a non-ferrous object moves closer. The critical frequency $F_C$ can be in the order of a few tens of kHz. At the nominal range $d_N$ of the sensor the inductance is lower in the former case than in the latter.

If the inductance L and the losses due to the target objects are represented by a complex series impedance $Z = r + jL\omega$ and the loss resistance $\underline{r}$ is plotted against the reactance $L\omega$ (FIG. 5), curves CM1 and CM2 are obtained respectively representing the complex impedance of the sensing coil for a non-ferrous target 14M1 and a ferrous target 14M2. The signal S2 is output as soon as the reactance falls below $L\omega_n$. The signal S3 is sent as soon as the loss resistance $\underline{r}$ is greater than $r_n$. The corresponding areas A1, A2 of the diagram overlap in a non-selective sensing quadrant Z. The discriminator logic removes any intermittency by devoting this quadrant exclusively to the sensing of non-ferrous objects.

Figure 7:
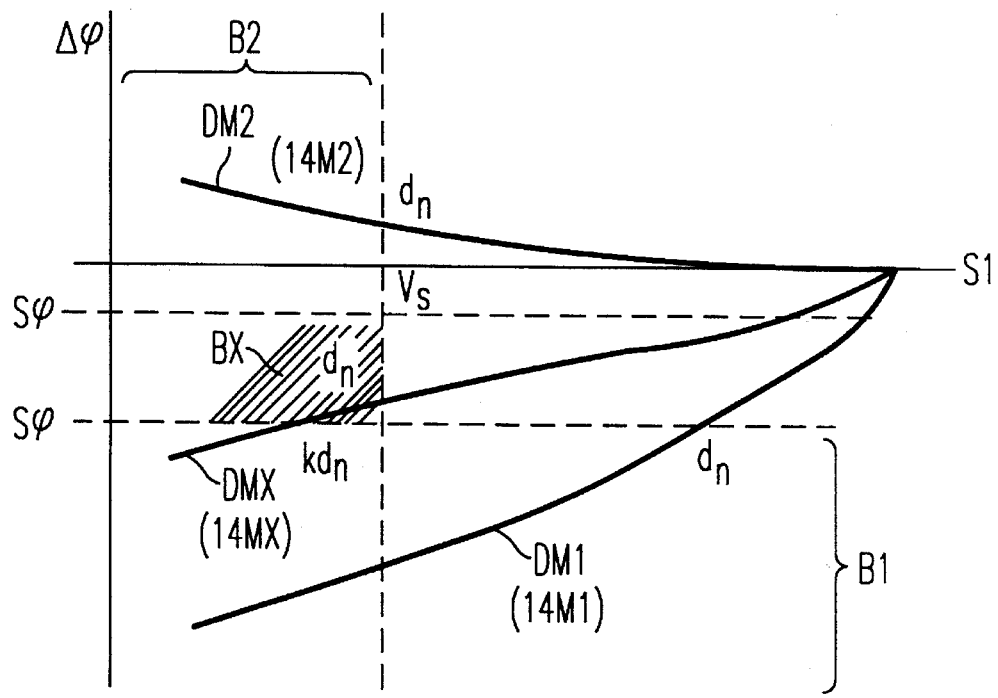
FIG. 7 is a graph used to explain the operation of the sensor from FIG. 6.

FIG. 7 shows the variation in the phase-shift Δφ between the signals S0 and S1 with the amplitude of the signal S1 from the resonant circuit. The curves DM1, DM2 show this variation for non-ferrous objects 14M1 and ferrous objects 14M2, respectively. The areas in which the objects 14M1 and 14M2 are sensed are shown at B1, B2, respectively. In the case of a target 14MX either of thin ferrous metal or of amagnetic stainless steel, it is sometimes necessary to identify the target as a non-ferrous object unambiguously. The curve DMX shows the variation Δφ(S1) observed in this case; as the object approaches it is first recognized as a ferrous object and then as a non-ferrous object (area of uncertainty BX). The invention then associates with the phase sensor 20 a second phase-shift threshold Sφ' below Sφ. If the phase difference between S0 and S1 exceeds Sφ' the phase sensor 20 outputs a signal S5 which is used to disable the effect of the damping signal (FIG. 6). The object 14MX is then sensed at a range kdN slightly less than (in the order of 0.8 times) the range dN at which the objects 14M1, 14M2 are sensed. The threshold Sφ' is such that as the object 14MX moves closer it is reached before the amplitude of signal S1 crosses the amplitude threshold Vs.

FIG. 6 is a block schematic of a sensor with this feature. The signal S5 is applied to an inhibiting input of the AND gate 23, for example.

To calibrate the ferrous object sensing range either the threshold voltage $V_S$ or the resistor R can be varied. To calibrate the non-ferrous object sensing range the frequency $F_0$ of the oscillator 15 and the natural frequency $F_{LC}$ of the resonant circuit can be tuned by means of the tuning circuit 16 and a phase-shift network 20a can be added to the input of the phase sensor 20 to introduce between S0 and S1, in the absence of any target, a phase-shift in the order of 120° (for example) and equal to Sφ (and possibly a phase-shift Sφ' less than the previous one), so that the sensor 20 outputs the signal S2 (and possibly the signal S5) for a null phase-shift; as an alternative, the frequencies $F_0$, $F_{LC}$ could be detuned by an amount equal to Sφ.

There is claimed:

1. An inductive proximity sensor comprising:
    a resonant circuit including a coil having a critical excitation frequency for sensing objects;
    a fixed frequency oscillator driving the resonant circuit at a frequency less than the critical excitation frequency of the coil of the resonant circuit;
    a processing unit receiving an output of the resonant circuit and including:
        a phase detector receiving an output from the resonant circuit and outputting a phase-shift signal if a phase-shift of the resonant circuit exceeds a predetermined threshold;
        an amplitude detector receiving the output from the resonant circuit, comparing the received output from the resonant circuit to a reference voltage, and outputting a damping signal if the received output from the resonant circuit is less than the reference voltage; and
        a discriminator circuit receiving the phase-shift signal from the phase detector and the damping signal from the amplitude detector and outputting a signal indicating that the sensed object is a non-ferrous object if the phase-shift signal is active and outputting a signal indicating that the sensed object is a ferrous object if the phase-shift signal is inactive and if the damping signal is active.

2. The sensor according to claim 1, wherein a resonant frequency of said resonant circuit and the critical excitation frequency of the coil are initially tuned and the excitation signal and a signal output of the resonant circuit are input to a phase-shifter which shifts their relative phases by an amount equal to the predetermined threshold of the phase detector.

3. The sensor according to claim 1, wherein a resonant frequency of said resonant circuit and the critical excitation frequency of the coil are initially detuned by an amount corresponding to a phase-shift equal to said predetermined threshold of said phase detector.

4. The sensor according to claim 1, wherein said phase detector further outputs an inhibiting signal if the phase-shift of the signal output from said resonant circuit exceeds a predetermined second threshold lower than the first threshold, said inhibiting signal being applied to said discriminator logic to invalidate the signal indicating that the sensed object is a ferrous object.

5. An inductive proximity sensor comprising:

resonant circuit means including a coil having a critical excitation frequency for sensing objects;

fixed frequency oscillator means for driving the resonant circuit means at a frequency less than the critical excitation frequency of the coil of the resonant circuit means;

processing means for receiving an output from the resonant circuit means and including:

phase detecting means for receiving an output from the resonant circuit means and for outputting a phase-shift signal if a phase-shift of the resonant circuit means exceeds a predetermined threshold;

amplitude detecting means for receiving the output from the resonant circuit means, for comparing the received output from the resonant circuit means to a reference voltage, and for outputting a damping signal if the received output from the resonant circuit means is less than the reference voltage; and discriminator means for receiving the phase-shift signal from the phase detecting means and the damping signal from the amplitude detecting means and for outputting a signal indicating that the sensed object is a non-ferrous object if the phase-shift signal is active and for outputting a signal indicating that the sensed object is a ferrous object if the phase-shift signal is inactive and if the damping signal is active.

6. The sensor according to claim 5, wherein a resonant frequency of said resonant circuit means and the critical excitation frequency of the coil are initially tuned and the excitation signal and a signal output of the resonant circuit are input to a phase-shifter which shifts their relative phases by an amount equal to the predetermined threshold of the phase detector.

7. The sensor according to claim 5, wherein a resonant frequency of said resonant circuit means and the critical excitation frequency of the coil are initially detuned by an amount corresponding to a phase-shift equal to said predetermined threshold of said phase detector means.

8. The sensor according to claim 5, wherein said phase detector means further outputs an inhibiting signal if the phase-shift of the signal output from said resonant circuit means exceeds a predetermined second threshold lower than the first threshold, said inhibiting signal being applied to said discriminator logic means to invalidate the signal indicating that the sensed object is a ferrous object.

* * * * *